(12) United States Patent
Kuwajima et al.

(10) Patent No.: US 11,260,637 B2
(45) Date of Patent: Mar. 1, 2022

(54) SHEET, LAMINATE, PIPE, RISER TUBE, AND FLOWLINE

(71) Applicant: DAIKIN INDUSTRIES, LTD., Osaka (JP)

(72) Inventors: Yuuki Kuwajima, Osaka (JP); Hayato Tsuda, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/607,274

(22) PCT Filed: Mar. 7, 2018

(86) PCT No.: PCT/JP2018/008694
§ 371 (c)(1),
(2) Date: Oct. 22, 2019

(87) PCT Pub. No.: WO2018/207446
PCT Pub. Date: Nov. 15, 2018

(65) Prior Publication Data
US 2020/0298542 A1    Sep. 24, 2020

(30) Foreign Application Priority Data

May 10, 2017  (JP) .............................. JP2017-093864

(51) Int. Cl.
*B32B 27/32* (2006.01)
*B32B 1/08* (2006.01)
(Continued)

(52) U.S. Cl.
CPC .............. *B32B 27/322* (2013.01); *B32B 1/08* (2013.01); *B32B 27/08* (2013.01); *C08J 5/042* (2013.01);
(Continued)

(58) Field of Classification Search
CPC ......... B32B 27/322; B32B 1/08; B32B 27/08; B32B 2327/12; B32B 2597/00; C08J 5/042; C08J 2327/16
See application file for complete search history.

(56) References Cited

U.S. PATENT DOCUMENTS

| 4,328,151 | A  | * | 5/1982  | Robinson | .................. C08J 3/226 |
|           |    |   |         |          | 264/127                       |
| 10,138,161 | B2 | * | 11/2018 | Ieva     | ...................... C03C 25/305 |

(Continued)

FOREIGN PATENT DOCUMENTS

| JP | 2007-517100 A | 6/2007 |
| JP | 2007-314720 A | 12/2007 |

OTHER PUBLICATIONS

International Preliminary Report on Patentability with a Translation ofWrltten Opinion in International Application No. PCT/JP2018/008694, dated Nov. 12, 2019.
(Continued)

*Primary Examiner* — Michael C Miggins
(74) *Attorney, Agent, or Firm* — Sughrue Mion, PLLC

(57) ABSTRACT

A sheet containing a carbon fiber and a fluororesin layer disposed around a carbon monofilament constituting the carbon fiber. A fluororesin constituting the fluororesin layer is polyvinylidene fluoride. Further, the sheet has a tensile strength of 400 MPa or higher. Also disclosed is a laminate including a first layer and a second layer that is disposed on the first layer and that includes the sheet; a pipe including the laminate; a riser tube including the pipe and a flowline including the pipe.

9 Claims, 4 Drawing Sheets

(51) Int. Cl.
  *B32B 27/08* (2006.01)
  *C08J 5/04* (2006.01)
(52) U.S. Cl.
  CPC ....... *B32B 2327/12* (2013.01); *B32B 2597/00* (2013.01); *C08J 2327/16* (2013.01)

(56) References Cited

U.S. PATENT DOCUMENTS

| | | |
|---|---|---|
| 2005/0118372 A1 | 6/2005 | Bonnet et al. |
| 2007/0275225 A1 | 11/2007 | Devic et al. |
| 2011/0052328 A1 | 3/2011 | Frerich et al. |
| 2011/0166278 A1 | 7/2011 | Hochstetter et al. |
| 2013/0028580 A1 | 1/2013 | Bigex et al. |
| 2013/0108250 A1 | 5/2013 | Bigex et al. |
| 2016/0369425 A1* | 12/2016 | Truhill .................... D02G 3/38 |

OTHER PUBLICATIONS

International Search Report for PCT/JP2018/008694 dated May 22, 2018 [PCT/ISA/210].
Extended European Search Report dated Nov. 16, 2020 from the European Patent Office in Application No. 18798608.8.

* cited by examiner

SHEET, LAMINATE, PIPE, RISER TUBE, AND FLOWLINE

CROSS REFERENCE TO RELATED APPLICATIONS

This application is a National Stage of Application No. PCT/JP2018/008694 filed Mar. 7, 2018, claiming priority based on Japanese Patent Application No. 2017-093864 filed May 10, 2017.

TECHNICAL FIELD

The invention relates to sheets, laminates, pipes, riser tubes, and flowlines.

BACKGROUND ART

Known fiber-reinforced composite materials containing a fluoropolymer as a matrix are as follows.

Patent Literature 1 discloses a reinforced fluoropolymer plate including a fluoropolymer layer on one of the faces thereof and a carbon fiber sheet on the other face, with at least part of the carbon fiber sheet being impregnated with a fluoropolymer.

Patent Literature 2 discloses a glass fiber-reinforced composite material including the following fluorine-containing copolymer (F) and a glass fiber (G).

The fluorine-containing copolymer (F) includes (a) a repeating unit based on tetrafluoroethylene and/or chlorotrifluoroethylene, (b) a repeating unit based on a fluorine monomer (excluding tetrafluoroethylene and chlorotrifluoroethylene), and (c) a repeating unit based on a monomer having an acid anhydride residue and a polymerizable unsaturated bond, the repeating unit (a) being present in an amount of 50 to 99.89 mol %, the repeating unit (b) being present in an amount of 0.1 to 49.99 mol %, and the repeating unit (c) being present in an amount of 0.01 to 5 mol % of 100 mol % in total of the repeating units (a) to (c).

CITATION LIST

Patent Literature

Patent Literature 1: JP 2007-517100 T
Patent Literature 2: JP 2007-314720 A

SUMMARY OF INVENTION

Technical Problem

The invention aims to provide a sheet having a higher tensile strength than conventional fiber-reinforced composite materials containing a fluororesin as a matrix.

Solution to Problem

The invention relates to a sheet including a carbon fiber and a fluororesin layer disposed around a carbon monofilament constituting the carbon fiber, a fluororesin constituting the fluororesin layer being polyvinylidene fluoride, the sheet having a tensile strength of 400 MPa or higher.

The polyvinylidene fluoride is preferably a homopolymer of vinylidene fluoride.

The sheet is preferably a tape.

The invention also relates to a laminate including a first layer and a second layer that is disposed on the first layer and that includes the above sheet.

The invention also relates to a pipe including the above laminate.

The invention also relates to a pipe including a first layer and a second layer that is disposed on the first layer and that includes the above sheet, the first layer and the second layer being stacked in the given order from an inner side of the pipe, the second layer being formed from the tape wrapped around an outer surface of the first layer.

The first layer of the pipe is preferably a flexible tube.

The invention also relates to a riser tube or flowline including the above pipe.

Advantageous Effects of Invention

The sheet of the invention has any of the above structures, and thus has a high tensile strength.

DESCRIPTION OF EMBODIMENTS

Figure 1A:
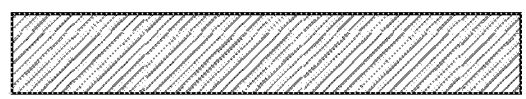
FIGS. 1(a) to 1(c) are schematic views of examples of the shape of a tape.

The invention will be specifically described hereinbelow.

The sheet of the invention contains a carbon fiber.

The carbon fiber preferably includes carbon monofilaments having an average fiber length of 5 mm or longer, more preferably includes carbon monofilaments having an average fiber length of 50 mm or longer, still more preferably includes carbon monofilaments having an average fiber length of 100 mm or longer. Most preferably, the carbon fiber is a continuous filament.

The carbon fiber preferably includes carbon monofilaments having an average diameter of 3 to 15 μm, more preferably includes carbon monofilaments having an average diameter of 4 to 9 μm.

The carbon monofilaments constituting the carbon fiber may be surface-treated, or may be treated with a treatment agent or a sizing agent, or may be plated with metal, for example.

The surface treatment enables introduction of an oxygen-containing functional group to the surface of the carbon fiber, for example.

Examples of the surface treatment for the carbon fiber include liquid chemical oxidation and electro-oxidation in the liquid phase, and gas phase oxidation. From the viewpoints of productivity and processing uniformity, preferred among these surface treatments is electro-oxidation treatment in the liquid phase. Examples of an electrolyte solution to be used in the electro-oxidation treatment include inorganic acids such as sulfuric acid and nitric acid, inorganic hydroxides such as sodium hydroxide and potassium hydroxide, and inorganic salts such as ammonium sulfate and sodium hydrogen carbonate.

Examples of the sizing agent include surfactants such as nonionic surfactants, anion surfactants, and amphoteric surfactants, mineral oils, and animal and vegetable oils. Specific examples thereof include ester compounds, alkylene glycol compounds, polyolefin compounds, phenyl ether compounds, polyether compounds, silicone compounds, polyethylene glycol compounds, amide compounds, sulfonate compounds, phosphate compounds, carboxylate compounds, fluorine compounds, urethane compounds, epoxy compounds, acrylic compounds, ionomer resin, silane-coupling agents, polyvinyl alcohol compounds, polysulfone compounds, polyether sulfone compounds, polyetherimide compounds, polyimide compounds, tertiary amine compounds, mineral oil, emulsifiers, electrolyte compounds, and any combination of two or more of these.

In order to improve the handleability, abrasion resistance, and fluff resistance of the carbon fiber, the sizing agent may contain any of known additives and aid components. Examples of the additives and aid components include dispersants, surfactants, lubricants, and stabilizers.

The amount of the sizing agent attached is preferably 0.2 to 5.0%, more preferably 0.3 to 3.0% of the whole mass of the carbon fiber strand. Too small an amount of the sizing agent attached may impair the handleability of the carbon fiber. Too large an amount of the sizing agent attached may impair the easiness of opening the carbon fiber.

Examples of the treatment agent include epoxy resin, urethane resin, silane coupling agents, water-insoluble polyamides, water-soluble polyamides, fluororesin, silicone resin, and any combination of two or more of these.

The use of the treatment agent enables introduction of a functional group to surfaces of the carbon monofilaments. The carbon monofilaments preferably have on their surfaces any of amide, carboxy, acid anhydride, alkoxycarbonyl, cyano, carbonate, carboxylic acid halide, hydroxy, glycidyl, imide, urethane, urea, sulfonyl, sulfo, epoxy, alkylene, hydrocarbon, halogen, N-oxide, N-hydroxy, nitro, nitroso, azo, diazo, azide, oxo, phenyl, phosphino, thio, S-oxide, thioxy, peroxy, ketone, acyl, acetyl, enol, enamine, formyl, benzoyl, acetal, hemiacetal, oxime, thiol, urea, isonitrile, allene, and thiol groups, and any combination of two or more of these.

The carbon monofilaments constituting the carbon fiber may be in the form of continuous fibers, long fibers, or staple fibers, for example. Examples of the form of the carbon fiber include, but are not limited to, a unidirectional carbon fiber sheet including carbon monofilaments paralleled in one direction, a laminate of two or more unidirectional carbon fiber sheets stacked at different angles, a sheet in which the carbon monofilaments are two dimensionally randomly oriented, fabric such as woven fabric, knitted fabric, or non-woven fabric formed from the carbon monofilaments, and a strand such as a braid. These are sometimes referred to as, for example, filament, tow, staple yarn, woven fabric (cloth), braid, chopped yarn, milled, felt, mat, or paper. The woven fabric may be a bidirectional woven fabric or a multi-axial woven fabric, for example. Two or more of these may be used in combination. In the case of a laminate, preferably, multiple layers are stacked in different directions, alternately stacked, or symmetrically placed in the thickness direction. In order to achieve excellent tensile properties, the carbon fiber is preferably in the form of a sheet, more preferably in the form of a unidirectional carbon fiber sheet including carbon fibers paralleled in one direction, woven fabric, or non-woven fabric, still more preferably in the form of a unidirectional carbon fiber sheet.

When the carbon fiber is in the form of a sheet, the sheet preferably has a thickness of 0.01 to 5 mm, more preferably 0.05 to 2.5 mm, still more preferably 0.1 to 2 mm.

Examples of the carbon fiber sheet include products of Toray Industries, Inc., such as CO6142, CO6151B, CO6343, CO6343B, CO6347B, CO6644B, CO1302, CO1303, CO5642, CO7354, CO7359B, CK6244C, CK6273C, CK6261C, UT70-20G, UT70-30G, UT70-40G, UT70-45G, UT70-60G, UM46-30G, UM46-34G, UM46-40G, BT70-20, and BT70-30, products of Mitsubishi Rayon Co., Ltd., such as TR3110M, TR3523M, TR6110HM, TR6120HM, TRK101M, TRK510M, TR3160TMS, TR3163TMS, TRK979PQRW, and TRK976PQRW, and products of Toho Tenax Co., Ltd., such as W-1103, W-1104, W-3101, W-310A, W-3104, W-3108, W-310F, W-3112, W-3121, W-3161, W-3162, W-6101, W-6110, W-6E01, W-7101, W-7161, W-7U61, W-3801, W-3802, W-3302, W-3303, and W-3304.

Examples of the carbon fiber include polyacrylonitrile-based, pitch-based, rayon-based, cellulose-based, lignin-based, phenol-based, and vapor-deposited carbon fibers. Preferred are polyacrylonitrile-based, pitch-based, and rayon-based carbon fibers.

In particular, a polyacrylonitrile-based carbon fiber is preferably used in the invention because it has excellent tensile strength.

Examples of the polyacrylonitrile-based carbon fiber include products of Toray Industries, Inc., such as T300-1000, 1300-3000, 1300-6000, 1300-12000, 13001B-1000, 13001B-3000, 13001B-6000, 13001B-12000, T400HB-3000, T400HB-6000, T700SC-12000, T700SC-24000, T800SC-24000, T800HB-6000, T800HB-12000, 1830HB-6000, T1000 GB-12000, T1100GC-12000, T1100GC-24000, M35JB-6000, M35JB-12000, M40JB-6000, M40JB-12000, M46JB-6000, M46JB-12000, M50JB-6000, M55J-6000, M55JB-6000, M60JB-3000, M60JB-6000, and M30SC-18000, products of Mitsubishi Rayon Co., Ltd., such as HT series including TR30S 3L, TR50S 6L, TR50S 12L, TR50S 15L, TR50D 12L, TRH50 18M, TRH50 60M, and TRW40 50L, IM series including MR60H 24P, HM series including MS40 12M, HR40 12M, and HS40 12P, and HT series including 34-700 and 37-800, and products of Toho Tenax Co., Ltd., such as HTA40, HTS40, HTS45, STS40, UTS50, IMS40, IMS60, IMS65, HWA35, UMS40, UMS45, UMS55, and HTS40MC.

In order to further increase the tensile strength of the sheet, the carbon fiber preferably has a tensile modulus (monofilament tensile modulus) of 100 to 1000 GPa, more preferably 200 to 500 GPa.

In order to further increase the tensile strength of the sheet, the carbon fiber preferably has a tensile strength (monofilament tensile strength) of 2000 to 10000 MPa, more preferably 3000 to 8000 MPa.

In order to further increase the tensile strength of the sheet in the case of using the polyacrylonitrile-based carbon fiber, the tensile modulus thereof is preferably 100 to 1000 GPa, more preferably 200 to 500 GPa. Also, in order to further increase the tensile strength of the sheet, the tensile strength thereof is preferably 2000 to 10000 MPa, more preferably 3000 to 8000 MPa.

The tensile modulus and the tensile strength are determined in accordance with JIS R 7606(2000).

The sheet of the invention includes a fluororesin layer, and a fluororesin constituting the fluororesin layer is polyvinylidene fluoride (PVdF). The inventors found that PVdF more firmly bonds to carbon monofilaments than other fluororesins. The presence of PVdF in addition to the carbon fiber allows the sheet of the invention to have a significantly high tensile strength.

The PVdF may be a homopolymer consisting only of a polymerized units based on vinylidene fluoride (VdF), or may be a polymer including a polymerized unit based on VdF and a polymerized unit based on a monomer ($\alpha$) copolymerizable with VdF. In order to achieve a much higher tensile strength, the PVdF is preferably a homopolymer of VdF.

Examples of the monomer ($\alpha$) include vinyl fluoride, trifluoroethylene, trifluorochloroethylene, fluoroalkyl vinyl ether, hexafluoropropylene, 2,3,3,3-tetrafluoropropene, and propylene. The examples also include unsaturated dibasic acid monoesters disclosed in JP H06-172452 A, such as monomethyl maleate, monomethyl citraconate, monoethyl citraconate, and vinylene carbonate, compounds containing a hydrophilic polar group such as $-SO_3M$, $-OSO_3M$, $-COOM$, or $-OPO_3M$ (wherein M is an alkali metal) or an amine-type polar group such as $-NHR^1$ or $-NR^2R^3$ (wherein $R^1$, $R^2$, and $R^3$ are alkyl groups) disclosed in JP H07-201316 A, such as $CH_2=CH-CH_2-Y$, $CH_2=C(CH_3)-CH_2-Y$, $CH_2=CH-CH_2-O-CO-CH(CH_2COOR^4)-Y$, $CH_2=CH-CH_2-O-CH_2-CH(OH)-CH_2-Y$, $CH_2=C(CH_3)-CO-CH_2-CH_2-CH_2-Y$, $CH_2=CH-CO-CH_2-CH_2-Y$, and $CH_2=CHCO-NH-C(CH_3)_2-CH_2-Y$ (wherein Y is a hydrophilic polar group, and $R^4$ is an alkyl group), maleic acid, and maleic anhydride. In addition, hydroxylated allyl ether monomers such as $CH_2=CH-CH_2-O-(CH_2)_n-OH$ (wherein $3 \leq n \leq 8$),

[Chem. 1]

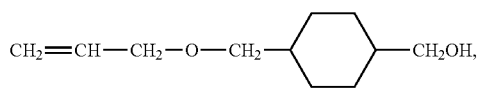

$CH_2=CH-CH_2-O-(CH_2-CH_2-O)_n-H$ (wherein $1 \leq n \leq 14$), and $CH_2=CH-CH_2-O-(CH_2-CH(CH_3)-O)_n-H$ (wherein $1 \leq n \leq 14$), and allyl ether and ester monomers carboxylated and/or substituted with $(CF_2)_n-CF_3$ (wherein $3 \leq n \leq 8$), such as $CH_2=CH-CH_2-O-CO-C_2H_4-COOH$, $CH_2=CH-CH_2-O-CO-C_5H_{10}-COOH$, $CH_2=CH-CH_2-O-C_2H_4-(CF_2)_nCF_3$, $CH_2=CH-CH_2-CO-O-C_2H_4-(CF_2)_nCF_3$, and $CH_2=C(CH_3)-CO-O-CH_2-CF_3$ each may also be used as a copolymerizable monomer. Unsaturated hydrocarbon monomers ($CH_2=CHR$, wherein R is a hydrogen atom, an alkyl group, or a halogen such as Cl) such as ethylene and propylene, fluorine monomers such as chlorotrifluoroethylene, hexafluoropropylene, hexafluoroisobutene, $CF_2=CF-O-C_nF_{2n+1}$ (wherein n is an integer of 1 or greater), $CH_2=CF-C_nF_{2n+1}$ (wherein n is an integer of 1 or greater), $CH_2=CF-(CF_2CF_2)_nH$ (wherein n is an integer of 1 or greater), and $CF_2=CF-O-(CF_2CF(CF_3)O)_m-C_nF_{2n+1}$ (wherein m and n are each an integer of 1 or greater) each may also be used.

Fluorine-containing ethylenic monomers containing at least one functional group represented by the following formula (1):

[Chem. 2]

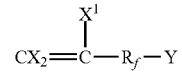

(1)

(wherein Y is $-CH_2OH$, $-COOH$, a carboxylic acid salt, a carboxy ester group, or an epoxy group; X and X' are the same as or different from each other, and are each a hydrogen atom or a fluorine atom; $R_f$ is a C1-C40 divalent fluorine-containing alkylene group or a C1-C40 divalent fluorine-containing alkylene group containing an ether bond) each may also be used. One or two or more of these monomers may be copolymerized.

For the PVdF containing a polymerized unit based on the monomer ($\alpha$), the polymerized unit based on VdF and the polymerized unit based on the monomer ($\alpha$) preferably represent respectively 95 mol % or more and 5 mol % or less, more preferably 95.5 mol % or more and 4.5 mol % or less, still more preferably 97.0 mol % or more and 3.0 mol % or less, particularly preferably 98.0 mol % or more and 2.0 mol % or less, most preferably 99.0 mol % or more and 1.0 mol % or less, of all polymerized units.

The amounts of the respective monomers of the copolymer can be calculated as the amounts of the monomer units by appropriate combination of NMR and elemental analysis in accordance with the types of the monomers.

The PVdF preferably has a melting point of 140° C. to 190° C., more preferably 150° C. to 180° C.

The melting point refers to the temperature corresponding to the peak on an endothermic curve obtained by thermal analysis at a temperature-increasing rate of 10° C./min using a differential scanning calorimeter RDC220 (Seiko Instruments Inc.) in conformity with ASTM D-4591.

The PVdF preferably has a melt flow rate (MFR) of 1 to 100 g/10 min, more preferably 5 to 50 g/10 min.

The MFR is a value determined at a temperature of 240° C. and a load of 5 kg in conformity with ASTM D3307-01.

The PVdF may be produced by a conventionally known method such as a method in which VdF and the monomer ($\alpha$) to constitute the polymerized units and additives such as a polymerization initiator are mixed as appropriate, and then solution polymerization or suspension polymerization is performed.

In the sheet of the invention, the fluororesin layer is disposed around a carbon monofilament constituting the carbon fiber. This means that the fluororesin constituting the fluororesin layer, i.e., the PVdF constitutes a matrix resin in the sheet of the invention. As described above, the PVdF more firmly bonds to carbon monofilaments than the other fluororesins. The presence of the PVdF serving as a matrix resin in addition to the carbon fiber allows the sheet of the invention to have a significantly high tensile strength.

In the sheet of the invention, at least part of the carbon monofilaments constituting the carbon fiber may preferably be impregnated with the fluororesin. At least part of the carbon monofilaments may preferably be embedded in the fluororesin layer. At least part of the carbon monofilaments may preferably intrude into the fluororesin layer.

The fluororesin and the carbon monofilament used in the sheet of the invention preferably exhibit a bond strength by the microdroplet method of 40 MPa or higher. The fluororesin and the carbon monofilament exhibiting a bond strength of 40 MPa or higher can more firmly bond to each other, resulting in a much higher tensile strength of the sheet. Too low a bond strength may cause a failure in exhibiting firm bonding between the resin and the carbon monofilament. In this case, the carbon monofilament may be fallen out of the resin during a tensile test on the sheet, resulting in a low tensile strength. The bond strength is more preferably 45 MPa or higher, still more preferably 50 MPa or higher, particularly preferably 55 MPa or higher, most preferably 60 MPa or higher.

The bond strength by the microdroplet method is a bond strength measured by the following method in which a fluororesin is used as a matrix resin and the resin is molten at a predetermined temperature to form a drop to be used.

First, both ends of a carbon monofilament taken out of a carbon fiber strand are fixed on a U-shaped test stand using adhesive. A fluororesin heated up to a predetermined temperature to melt is brought into contact with the carbon monofilament fixed on the U-shaped test stand, whereby the fluororesin is attached to the carbon monofilament. The carbon monofilament with the fluororesin attached thereto is cooled at room temperature, and the fluororesin is again molten into a droplet shape. The carbon monofilament with the fluororesin attached thereto is again sufficiently cooled at room temperature, and the test stand is mounted on a test stand-mounting folder. The test stand-mounting folder is coupled with a test stand transfer device equipped with a load cell, and the test stand can be moved in the filament axis direction of the carbon monofilament at a constant speed. Then, the test stand is moved in the filament axis direction of the carbon monofilament at a speed of 0.3 mm/min, and the maximum load in pulling the carbon monofilament out of the fluororesin droplet is measured. This value is divided by the contact area between the microdroplet and the carbon monofilament before the measurement, and the resulting value is taken as the bond strength. The test is performed using a microdroplet having a diameter of 50 to 90 μm at room temperature. The result of the sample is an average of N=20 or more.

The sheet of the invention is preferably prepared by combining a film or powder of the fluororesin and the carbon fiber, more preferably prepared by combining a film or powder of the fluororesin and the carbon fiber in the form of a sheet, still more preferably prepared by combining a film or powder of the fluororesin and the unidirectional carbon fiber sheet of the carbon fiber.

The combining may be performed, for example, by molding the fluororesin into a film and then heat-pressing the film and the carbon fiber. The carbon fiber is preferably in the form of a sheet, and is more preferably the unidirectional carbon fiber sheet. In the case of using the carbon fiber in the form of a sheet or the unidirectional carbon fiber sheet, the fluororesin film may be disposed on each surface of the carbon fiber and the materials may be combined by heat-pressing.

The film to be used in the combining may be obtained by molding the fluororesin by a technique such as extrusion molding or press molding.

The film preferably has a tensile strength of 1 to 200 MPa, more preferably 10 to 100 MPa.

The film preferably has a tensile modulus of 50 to 10000 MPa, more preferably 100 to 5000 MPa.

The film preferably has a tensile elongation of 10% to 1000%, more preferably 50% to 500%.

The tensile strength, tensile modulus, and tensile elongation of the film and the sheet of the invention are determined by a tensile test performed under the following conditions.
(Tensile Test Conditions)
Tension rate: 100 mm/min
Shape of sample: micro dumbbell The sheet of the invention has a tensile strength of 400 MPa or higher. This allows the sheet of the invention to have a significantly higher tensile strength than sheets containing a fluororesin other than the PVdF as a matrix resin. The tensile strength is preferably 500 MPa or higher, more preferably 600 MPa or higher. The upper limit thereof may be 10000 MPa.

The sheet of the invention preferably has a tensile modulus that is twice or more, more preferably three times or more, still more preferably five times or more, most preferably eight times or more the tensile modulus of the film before combining. The upper limit thereof may be 1000 times.

The sheet of the invention preferably has a tensile modulus of 15000 MPa or higher, more preferably 20000 MPa or higher, still more preferably 30000 MPa or higher. The upper limit thereof may be 1000000 MPa.

The sheet of the invention preferably has a tensile elongation of 1% or higher, more preferably 2% or higher, still more preferably 3% or higher, most preferably 3.5% or higher. The upper limit thereof may be 100%.

In order to achieve a much higher tensile strength, tensile modulus, and tensile elongation of the sheet, the mass ratio between the fluororesin and the carbon fiber in the sheet is preferably 10:90 to 90:10, more preferably 20:80 to 80:20, still more preferably 30:70 to 70:30, most preferably 30:70 to 60:40.

In addition to the fluororesin and the carbon fiber, the sheet may further contain any of different components. Examples of the different components include fillers, plasticizers, processing aids, release agents, pigments, flame retarders, lubricants, photostabilizers, weather-resistance stabilizers, conductive agents, antistatic agents, ultraviolet absorbers, antioxidants, blowing agents, flavors, oils, agents to impart flexibility, dehydrofluorinating agents, nucleating agents, softeners, surfactants, and impregnation aids.

Examples of the fillers include polytetrafluoroethylene, mica, silica, talc, celite, clay, titanium oxide, and barium sulfate. An example of the conductive agents is carbon black. Examples of the plasticizers include dioctyl phthalate and pentaerythritol. Examples of the processing aids include carnauba wax, sulfone compounds, low molecular weight polyethylene, and fluorine-based aids. Examples of the dehydrofluorinating agents include organic onium compounds and amidines.

A resin other than the above fluororesin or a rubber may be blended into the sheet. Preferred is a blend thereof with at least one selected from the group consisting of polyether ether ketone (PEEK) and polytetrafluoroethylene (PTFE).

The fluororesin contained in the sheet may be crosslinked. This can improve the abrasion resistance against metal, the rapid gas decompression resistance, and the chemical resistance.

In order to further improve the abrasion resistance against metal, the crosslinking is preferably achieved by radiation crosslinking.

In the radiation crosslinking, the sheet is irradiated with radiation. Examples of the radiation include electron beams, ultraviolet rays, gamma rays, X-rays, neutron beams, and high-energy ions. Preferred are electron beams because they have an excellent penetrating ability, a high dose rate, and are suitable for industrial production.

The irradiation may be performed by any method, such as a method with a conventionally known irradiation device.

The irradiation may be performed in any environment. The environment preferably has an oxygen concentration of 1000 ppm or less. It is more preferably in the absence of oxygen, still more preferably in vacuo or in an atmosphere of inert gas such as nitrogen, helium, or argon.

The irradiation temperature is preferably 0° C. to 300° C., more preferably 5° C. or higher, still more preferably 10° C. or higher, particularly preferably 20° C. or higher, while more preferably 100° C. or lower. The irradiation temperature is also preferably not higher than the glass transition temperature of the fluororesin, more preferably not higher than the melting point of the fluororesin. Too high an irradiation temperature may cause decomposition of the resin. Too low an irradiation temperature may cause insufficient crosslinking.

Preferably, the irradiation temperature falls within the above numerical range and is lower than the melting point of the fluororesin.

The irradiation temperature may be adjusted by any method, including known methods. Specific examples thereof include a method of holding the fluororesin in a heating furnace maintained at a predetermined temperature and a method of placing the fluororesin on an electric griddle and then heating the electric griddle by supplying an electric current to a built-in heater of the electric griddle or by means of an external heater.

The radiation exposure is preferably 10 to 500 kGy, more preferably 15 to 400 kGy, still more preferably 20 to 300 kGy, particularly preferably 30 to 250 kGy, most preferably 30 to 150 kGy. Too high or too low an exposure may cause insufficient crosslinking.

The crosslinked sheet preferably has a melt flow rate (MFR) of 0 to 1 g/10 min, more preferably 0 to 0.1 g/10 min.

The sheet of the invention is preferably a tape. The tape is preferably a band-like article having flexibility that allows the tape to be coiled (wrapped). The tape of the invention has a high tensile strength.

The tape of the invention may have any substantially band-like shape, and examples thereof are as follows.

(1) Those Having a Rectangular Cross Section

The tape of Embodiment (1) has a simple shape and is easy to produce.

FIG. 1(a) shows an exemplary cross section of the tape of Embodiment (1).

(2) Those Having Thin Portions at the Respective Widthwise Ends

The tape of Embodiment (2) can be wrapped around an object without a gap by wrapping the tape such that the corresponding thin portions of adjacent wraps of the tape overlap each other. Thus, even when applied to a tape layer constituting a flexible pipe for a high-temperature fluid stream, the tape can easily inhibit permeation of the high-temperature fluid to the outside. Further, overlapping of the thin portions can easily provide a tape layer having a uniform thickness.

The thin portions at the respective widthwise ends are preferably disposed on the opposite ends in the thickness direction. In other words, preferably, one thin portion is disposed on the upper end side while the other is disposed on the lower end side in the thickness direction.

Figure 1B:
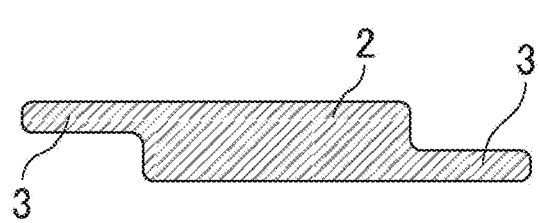

FIG. 1(b) shows an exemplary cross section of the tape of Embodiment (2).

A tape 1b has thin portions 3 that are thinner than a central portion 2 at the respective widthwise ends. One thin portion 3 is disposed on the upper end side while the other thin portion 3 is disposed on the lower end side in the thickness direction of the tape 1b.

It should be noted that Embodiment (2) does not include Embodiment (3) described below.

(3) Those Having a Shape with a Widthwise End being interlockable with the Corresponding Widthwise End of an Adjacent Wrap of the Tape in a Wrapped State Examples of the tape of Embodiment (3) include those having a cross section such as, but not limited to, a substantially Z-like shape, a substantially U-like shape, a substantially S-like shape, a substantially T-like shape, or a substantially I-like shape.

The tape of Embodiment (3) can provide a tape layer in which the wraps of the tape are interlocked with each other by wrapping the tape such that a widthwise end of one wrap of the tape is engaged with the corresponding widthwise end of an adjacent wrap of the tape. Thus, when applied to a tape layer constituting a flexible pipe for a high-temperature fluid stream, the tape can be prevented from shifting during bending or twisting of the flexible pipe. This can more securely prevent outflow of the fluid passing through the flexible pipe.

The tape of Embodiment (3) particularly preferably has a substantially Z-like cross section. Specifically, the tape preferably has thin portions at the respective widthwise ends and has protrusions extending from the respective thin portions at the widthwise ends in the opposite directions (counter directions) in the thickness direction.

This tape has key-like portions (key portions) at the respective widthwise ends, and thus can provide a tape layer in which the wraps of the tape are interlocked with each other by wrapping the tape such that the key portions of adjacent wraps of the tape are engaged with each other, in other words, by wrapping the tape such that a recess defined by a protrusion and a thin portion of one wrap of the tape is fit into the corresponding protrusion of an adjacent wrap of the tape.

Figure 1C:
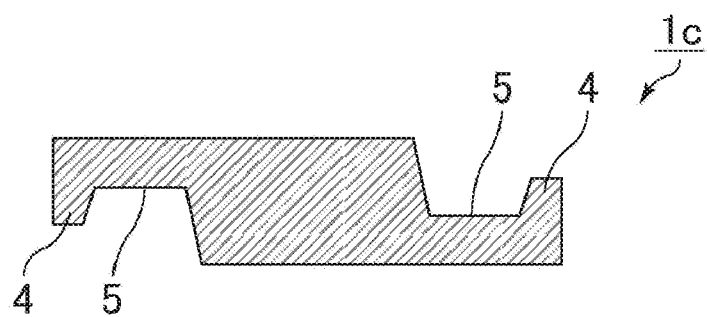

FIG. 1(c) shows an exemplary cross section of the tape of Embodiment (3).

A tape 1c has a substantially Z-like cross section. The tape 1c has thin portions 5 at the respective widthwise ends, and further has protrusions 4 extending from the two thin portions 5 in the opposite directions (counter directions) in the thickness direction.

The tape of the invention is particularly preferably the tape of Embodiment (3).

The tape of the invention can be produced by molding the fluororesin and the carbon fiber, if necessary together with any of the above different components, by a technique such as extrusion molding, pultrusion, press molding, melt infiltration, extrusion laminating, or dry powder coating. Any of these molding techniques may be combined.

Alternatively, the fluororesin, if necessary together with any of the above different components, may be processed into filaments, the filaments may be woven into a woven tape with a desired shape, and the woven tape may be combined with the carbon fiber.

The pultrusion, the dry powder coating, and the extrusion laminating may be performed by the methods described in the following literature:

Ben Goichi, "Molding and properties of continuous fiber FRTP (Renzoku seni FRTP no Seikei hou to Tokusei)", The Nikkan Kogyo Shimbun, Ltd., Mar. 30, 2015, pages 75, 85, and 143.

The tape of the invention may have an appropriately adjusted width, thickness, and length in accordance with the use thereof. In the case of applying the tape of the invention to flexible pipes for high-temperature fluid streams such as riser tubes, the width may be 1 mm to 10 m and the thickness may be 10 μm to 5 cm, for example. The length may be determined in accordance with factors such as the amount of the tape to be used. In the case of applying the tape to flexible pipes for high-temperature fluid streams, the length may be about 1 m to 1000 km.

The invention also relates to a laminate including a first layer and a second layer that is disposed on the first layer and that includes the aforementioned sheet.

One or both of the surfaces of each layer of the laminate may be treated by a technique such as plasma discharge or corona discharge. Further, an adhesive may be applied thereto. The first layer and the second layer may or may not be bonded to each other.

The first layer preferably contains a polymer. Examples of the polymer include fluoropolymers, polyether ether ketone (PEEK), polyimide, polyether ketone, polyether ketone ketone, polyether ketone ether ketone ketone, polyamide, polyethylene, and mixtures thereof.

Examples of the fluoropolymers include the aforementioned PVdF and tetrafluoroethylene/vinylidene fluoride copolymers. Preferred is PVdF because it enables easy fusion.

The laminate may further include a layer different from the first layer and the second layer. For example, in accordance with the use, a different layer may be disposed on the surface of the first layer opposite to the second layer and/or on the surface of the second layer opposite to the first layer.

The laminate is preferably a pipe. When the laminate is a pipe, the sheet is preferably a tape. In addition, when the laminate is a pipe, the first layer may be a flexible tube as described below.

The invention also relates to a pipe including a first layer and a second layer that is disposed on the first layer and that is formed from the tape, the first layer and the second layer being stacked in the given order from an inner side of the pipe, the second layer being formed from the tape wrapped around an outer surface of the first layer. The first layer and the second layer may or may not be bonded to each other.

Pipes used in offshore oil fields include risers (pipes for pumping up crude oil), umbilicals (integration of pipes for supplying chemicals for crude oil viscosity reduction for the purpose of controlling the pumping, power cables, and others), flowlines (pipes for transporting pumped crude oil which extend on the sea floor), and the like. They have various structures, and known pipes include metal-made pipes and metal/resin hybrid pipes. In order to achieve weight reduction, use of metal-made pipes tends to be reduced and metal/resin hybrid pipes are becoming the mainstream.

Conventional pipes used for offshore oil fields are provided with multiple metal layers so that they are resistant to inside and outside pressures. Such pipes can therefore be used for a high-pressure fluid stream or applied to deep-sea uses. However, fluids passing through the pipes often contain corrosive substances such as hydrogen sulfide, and the corrosive substances may permeate the resin layer and corrode the metal layer. Further, a high-pressure fluid passing through a pipe applies pressure to the resin layer, and the resin layer bites into the metal layer which is harder than the resin layer, causing damages. Further, lighter-weight pipes are awaited.

The pipe of the invention including the second layer having a high tensile strength has excellent pressure resistance. Therefore, the number of metal layers can be reduced and the thickness of the metal layer can be reduced. Further, the pipe of the invention has better corrosion resistance and a lighter weight than conventional pipes. Further, the pipe is likely to avoid a structure of layers causing biting of the resin layer.

The pipe, when applied to a flexible pipe for a high-temperature fluid stream such as a riser tube, can inhibit permeation of the high-temperature fluid to the layer outside the second layer, and thus can prevent corrosion of the layer outside the second layer. This structure can also prevent a reduction in strength of the flexible pipe.

The first layer is preferably a flexible tube. The flexible tube may have either a monolayer structure or a multilayer structure. The multilayer structure may be formed by any method, preferably known sequential extrusion molding or co-extrusion molding.

The tube may be constituted by any material capable of imparting flexibility to the tube, and any of known materials used for various flexible pipes may be selected in accordance with the use. Example of the material include polymers, and specific examples thereof include fluoropolymers, polyether ether ketone (PEEK), polyimide, polyether ketone, polyether ketone ketone, polyether ketone ether ketone ketone, polyamide, polyethylene, and mixtures thereof.

Examples of the fluoropolymers include the aforementioned PVdF and tetrafluoroethylene/vinylidene fluoride copolymers.

In the second layer, the tape is preferably disposed such that the wraps of the tape are adjacent to each other in the width direction. Further, widthwise ends of adjacent wraps of the tape are preferably interlocked with each other. This embodiment can be achieved by the use of the tape of Embodiment (3), for example.

The second layer may include multiple layers of the tape.

Figure 2:
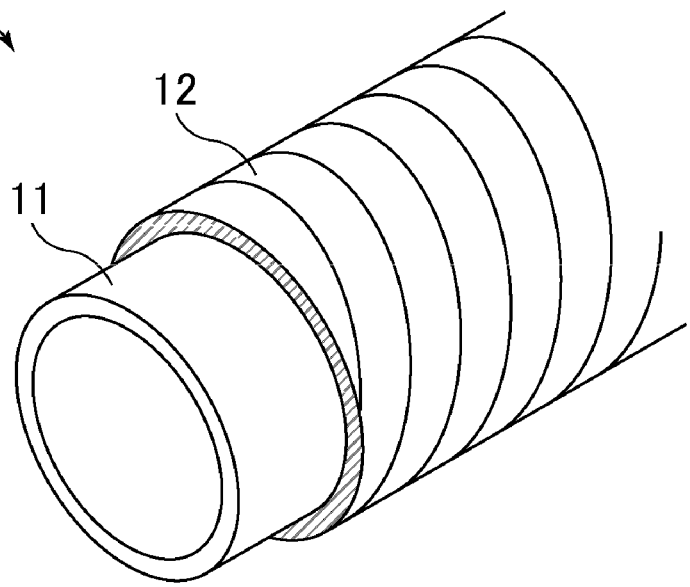
FIG. 2 is a schematic view of an example of the structure of a pipe.

In the pipe of the invention, the first layer and the second layer are each in the form of a tube, and the second layer is disposed on the first layer. FIG. 2 is a schematic view of an example of the structure of the pipe of the invention.

Since the second layer in the pipe is formed from the tape of the invention, the pipe is less likely to suffer reduction in mechanical strength even when used in a high-temperature environment. The pipe, when applied to a flexible pipe for a high-temperature fluid stream such as a riser tube, can inhibit permeation of the high-temperature fluid to the layer outside the second layer, and thus can prevent corrosion of the layer outside the second layer. This structure can also prevent a reduction in strength of the flexible pipe.

In the pipe of the invention, the tape layer (second layer) formed from the resin has a better heat-insulating effect than metal layers. Thus, the second layer can inhibit a temperature decrease inside the pipe (in a portion inside the second layer). This is especially effective in transporting a material that suffers a rapid increase in viscosity when the temperature decreases and thereby becomes unable to flow inside the pipe. The heat-insulating effect can be further improved by foaming the tape to form cells therein, for example.

The second layer in the pipe of the invention is formed by wrapping the tape around the outer surface of the first layer. When the second layer is a tape-wrapping layer formed by wrapping the tape around the outer surface of the first layer, the wraps of the tape have play therebetween and the tape does not extend when the pipe is bent. Thus, this second layer can exert an effect of preventing reduction in physical properties or deformation of the tape layer after the pipe returns to the original state.

Figure 3:
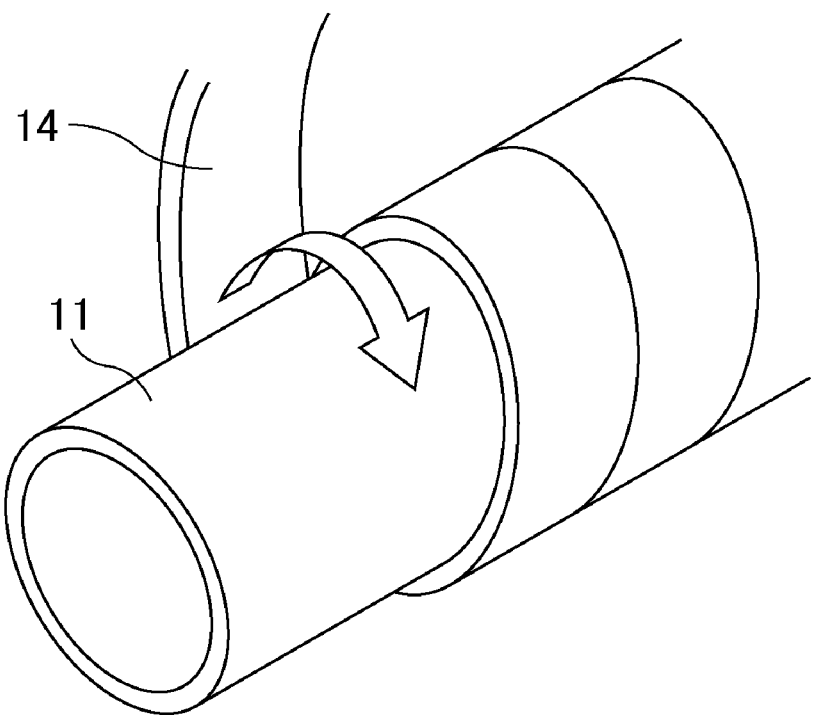
FIG. 3 is a schematic view of an example of a method for wrapping the tape.

The tape may be wrapped by any method, and is preferably wrapped spirally around the outer surface of the first layer, for example. FIG. 3 is a schematic view of an example of a method for wrapping the tape. A tape 14 (the tape of the invention) is spirally wrapped around the outer surface of a tubular inner layer 11 (a first layer) in the direction indicated by the arrow in the figure.

Figure 4A:
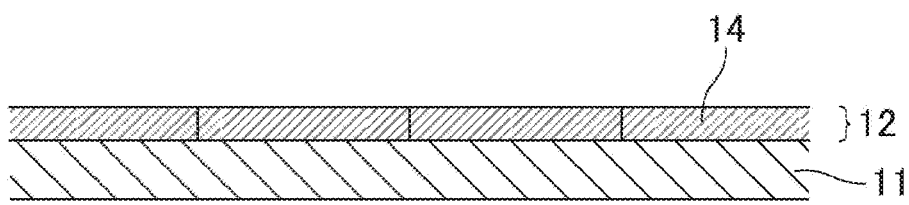
FIGS. 4(a) to 4(e) are schematic views of examples of the tape in a wrapped state.
Figure 4B:
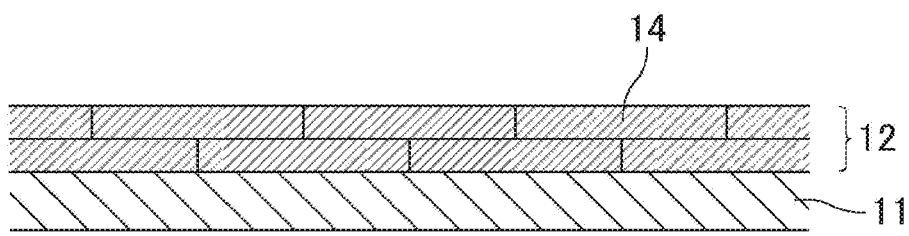

The tape may be wrapped around the outer surface of the first layer such that the corresponding widthwise ends of the adjacent wraps of the tape do not overlap each other (see, for example, FIG. 4(a)). In the case of wrapping the tape in multiple layers, the angle of wrapping the tape may be changed for each layer. Another piece of the tape may be further wrapped in the same manner around the outer surface of the resulting tape-wrapping layer with the wrapping position being shifted so as to cover the boundaries of the previous wrapping of the tape (see, for example, FIG. 4(b)). This can more securely inhibit permeation of a high-temperature fluid. In this case, the tape for the lower layer (inner layer) and the tape for the upper layer (outer layer) may be wrapped in the same direction. Still, the tapes are preferably wrapped in the opposite directions because the tensions applied to the pipe during wrapping are balanced and thus the tapes can be easily wrapped.

Figure 4C:
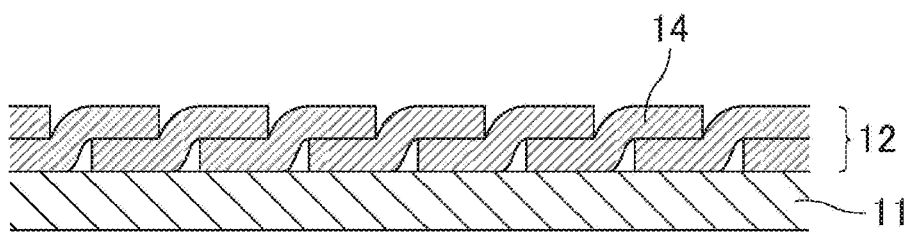
Figure 4D:
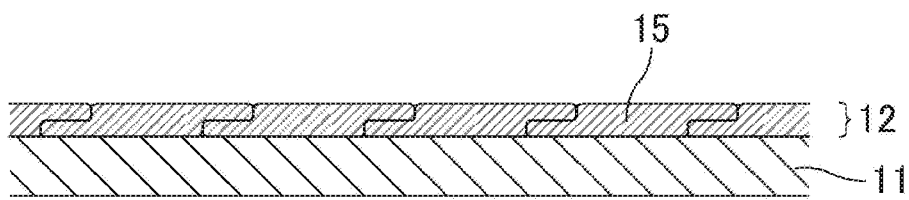

The tape may be wrapped such that the corresponding widthwise ends of the adjacent wraps of the tape overlap each other (see, for example, FIG. 4(c)). This can more securely inhibit permeation of a high-temperature fluid. In this embodiment, the tapes may also be wrapped in multiple layers in either the same direction or the opposite directions.

In the case of the tape having thin portions at the respective widthwise ends, the tape is preferably wrapped such that the corresponding thin portions of the adjacent wraps of the tape overlap each other (see, for example, FIG. 4 (d)). This can more securely inhibit permeation of a high-temperature fluid, and can also easily provide a tape-wrapping layer having a uniform thickness. In this embodiment, the tape may also be wrapped in multiple layers in either the same direction or the opposite directions.

Figure 4E:
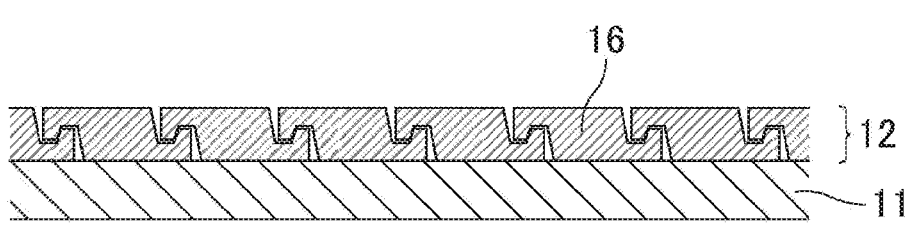

In the case of the tape having shapes that can be interlocked with each other, the tape is preferably wrapped such that the corresponding widthwise ends of the adjacent wraps of the tape are engaged with each other (see, for example, FIG. 4(e)). This can provide a tape-wrapping layer with the wraps of the tape interlocked with each other, and thus can prevent shifting of the tape when the pipe is bent or twisted. As a result, this can more securely inhibit permeation of a high-temperature fluid, and can also easily provide a tape-wrapping layer having a uniform thickness. In this embodiment, the tape may also be wrapped in multiple layers in either the same direction or the opposite directions.

The tape may be wrapped using a known tape wrapper.

In the second layer, the corresponding widthwise ends of the adjacent wraps of the tape are preferably interlocked with each other. This embodiment may be achieved by wrapping the tape of Embodiment (3) around the outer surface of the first layer such that the corresponding widthwise ends of the adjacent wraps of the tape are engaged with each other, for example.

Figure 5:
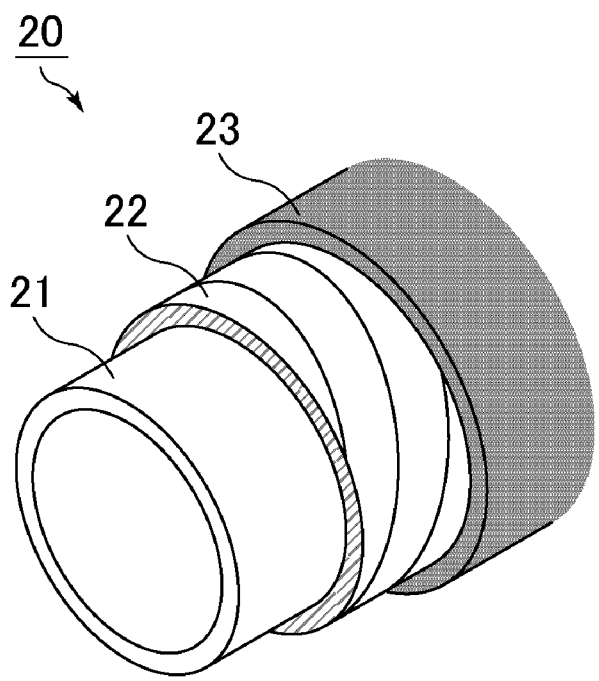
FIG. 5 is a schematic view of another example of the structure of the pipe.

The pipe of the invention preferably further includes a third layer disposed on the second layer. Examples of the material to be used for the third layer include metal, resin, and rubber. Preferred among these is metal. The third layer can be formed by covering the outer surface of the second layer with a necessary material by a known method, for example. FIG. 5 is a schematic view of an example of the structure of the pipe of this embodiment. A pipe 20 includes a first layer 21, a second layer 22, and a third layer 23 (reinforcing layer) stacked in the given order from the inner side.

In this embodiment, a bilayer laminate of the second layer and the third layer is disposed on the outer layer side of the first layer, and this laminate can reinforce the first layer. In particular, when the third layer is a layer formed of metal, it can more sufficiently reinforce the first layer. Even when a high-temperature fluid is passed inside the first layer, the second layer can inhibit permeation of the high-temperature fluid from the second layer to the third layer, and thus can prevent corrosion of the third layer. Further, this can prevent a reduction in the effect of reinforcing the first layer even under high-temperature conditions.

The pipe of the invention may optionally include an additional layer disposed on the outer surface of the third layer and/or an additional layer disposed on the inner surface of the first layer, as needed.

The pipe of the invention has the aforementioned excellent characteristics, and thus can suitably be used for a flexible metal tube disclosed in JP H07-276523 A, a high-temperature-fluid transport pipe disclosed in JP S61-6485 A, and a multilayer flexible pipe disclosed in US 2008/0314471 A, for example.

A riser tube and a flowline each including the aforementioned pipe of the invention are also encompassed by the invention. The riser tube and the flowline can suitably be used as a riser tube and a flowline for transporting a material from the sea floor to the surface of the sea in an offshore oil field or a gas field. Examples of the material include fluids such as crude oil, petroleum gas, and natural gas.

Figure 6:
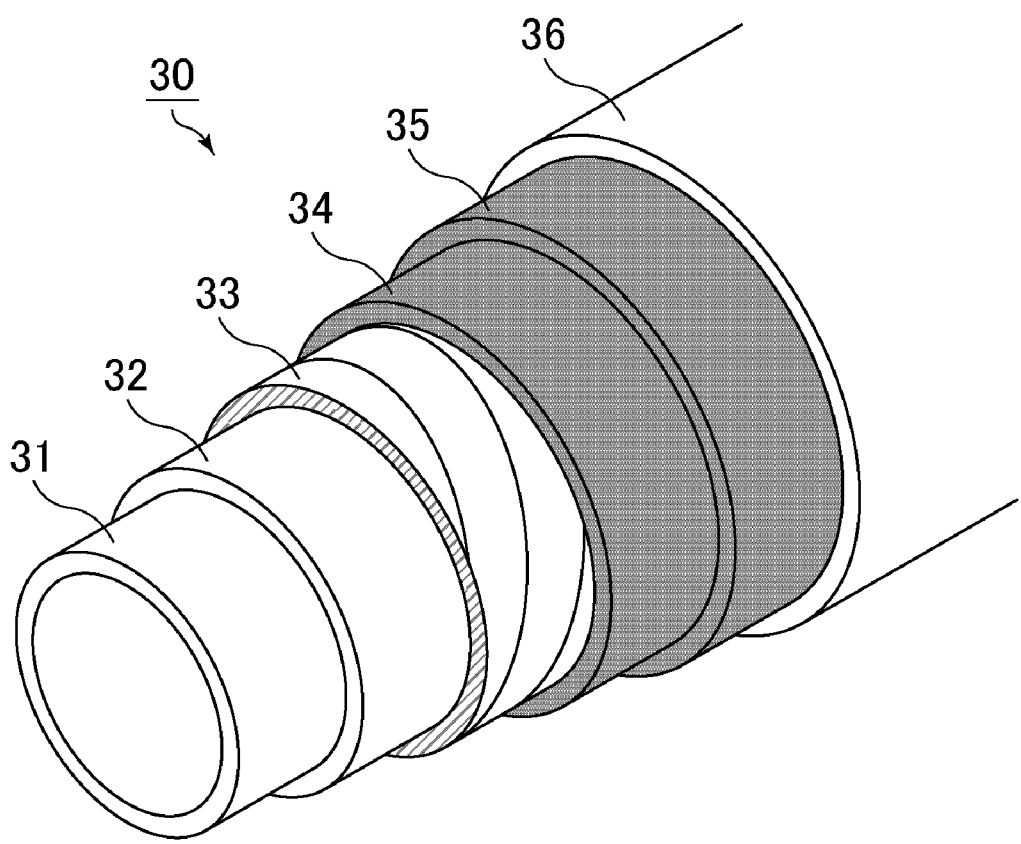
FIG. 6 is a schematic view of an example of the structure of a riser tube (or a flowline).

FIG. 6 illustrates an exemplary embodiment of the riser tube (or the flowline) of the invention. It should be noted that the riser tube and the flowline of the invention are not limited thereto.

A riser tube (or flowline) 30 includes a body (carcass) 31 serving as an innermost layer which can provide high-pressure resistance and maintain the pipe shape even when the riser tube (or flowline) 30 is used in the deep sea. The outer surface of the body 31 is covered with a first layer 32 serving as a fluid barrier layer. The first layer 32 prevents a material passing through the riser tube (or flowline) from leaking to the outside.

The outer surface of the first layer 32 is covered with a second layer 33, a first reinforcing layer 34, and a second reinforcing layer 35 as reinforcing layers. These layers exhibit an effect of preventing burst of the riser tube (or flowline) due to the pressure of a material passing through the tube. The first reinforcing layer 34 and the second reinforcing layer 35 may be made of metal, and may be formed of metal strips wrapped in the opposite directions such that the riser tube can be resistant to stresses applied in different directions. A friction-resistant layer may be disposed between the first reinforcing layer 34 and the second reinforcing layer 35. The second layer 33 is a layer formed by wrapping the tape of the invention around the outer surface of the first layer 32, and reinforces the first layer. In a conventional riser tube, a layer corresponding to this layer is made of metal. Owing to such a feature, the riser tube 30 can include only two metal layers although a conventional riser tube includes three metal layers. In order to reduce the number of metallic reinforcing layers, the first reinforcing layer 34 or the second reinforcing layer 35 may be formed from the tape of the invention wrapped or two or more reinforcing layers may be formed from the tape of the invention wrapped.

In order to prevent damage to the first layer 32 which may be caused by a contact with a metallic reinforcing layer, a thermoplastic resin layer may be disposed between the first layer 32 and the body 31. An outer layer resin 36 is disposed on the outer surface of the first reinforcing layer 34 and the second reinforcing layer 35, and plays a role of partitioning the inside and outside of the riser tube (or flowline). The outer layer resin 36 may be formed from polyethylene or polyamide.

In addition to the riser tube and the flowline, the sheet or tape of the invention may be applied to other uses, and may suitably be used as a sheet or tape for forming friction-resistant layers of metal pipes for transporting fluids such as crude oil and natural gas whether in the ground, on the ground, or on the sea floor, for example. Crude oil and natural gas contain carbon dioxide and hydrogen sulfide which cause corrosion of metal pipes. The sheet or tape of the invention can block them to inhibit corrosion of metal pipes or to reduce the fluid friction due to highly viscous crude oil. In order to bond the sheet or tape to metal, adhesive may be used or the metal surface may be roughened. The sheet or tape of the invention exhibits characteristics suitable as seals, bellows, diaphragms, hoses, tubes, and electric wires, such as gaskets and non-contact or contact packings (self-seal packings, piston rings, split ring packings, mechanical seals, and oil seals) requiring heat resistance, oil resistance, fuel oil resistance, LLC resistance, and steam resistance for high-temperature parts around automobile engines or portions requiring chemical resistance, such as engine bodies, main drive systems, valve train systems, lubrication and cooling systems, fuel systems, and intake and exhaust systems of automobile engines; transmission systems of driveline systems; steering systems of chassis; braking systems; and basic electrical parts, electrical parts of control systems, electrical accessories, and the like of electrical components. In addition to the automobile-related uses, the sheet or tape of the invention is suitable for uses such as oil-, chemical-, heat-, steam-, or weather-resistant packings, O-rings, hoses, other sealants, diaphragms, and valves in transports such as shipping and aircraft; similar packings, O-rings, sealants, diaphragms, valves, hoses, rolls, tubes, chemical-resistant coatings, and linings used in chemical plants; similar packings, O-rings, hoses, sealants, belts, diaphragms, valves, rolls, and tubes used in food plant equipment and food machinery (including household items); similar packings, O-rings, hoses, sealants, diaphragms, valves, and tubes used in equipment for nuclear power plants; and similar packings, O-rings, hoses, sealants, diaphragms, valves, rolls, tubes, linings, mandrels, electric wires, flexible joints, belts, rubber plates, weather strips, and roll blades for plain paper copiers used in general industrial parts. The sheet or tape of the invention exhibits chemical resistance, low elution, and less flavor permeation, and thus can be applied to uses such as oil-, chemical-, heat-, steam-, or weather-resistant sealants, cap materials, belts, rolls, hoses, tubes, films, coatings, linings, joints, and containers in the medical and chemical fields.

The laminate of the invention may also be applied to pipes. In this case, pipes formed from the laminate can be produced by a typical method without any limitation. The pipes include corrugated tubes.

The sheet or tape of the invention has excellent properties such as mechanical properties, heat resistance, oil resistance, amine resistance, and chemical resistance, and thus may be used as various parts in various fields such as the automobile industry, the aircraft industry, and the semiconductor industry.

Examples of the fields where the sheet or tape is used include the field relating to semiconductors, the field of automobiles, the field of aircraft, the field of space and rockets, the field of shipping, the field of chemistry such as chemical plants, the field of chemicals such as pharmaceuticals, the field of photography such as film processors, the field of printing such as printers, the field of coating such as coating equipment, the field of analysis and physical and chemical instruments such as analyzers and meters, the field of food machinery such as food plant equipment and household items, the field of beverage and food production equipment, the field of drug production equipment, the field of medical parts, the field of equipment for transporting chemicals, the field of equipment for nuclear power plants, the field of steel such as sheet steel processing equipment, the field of general industry, the field of electrics, the field of fuel cells, the field of electronic parts, the field of parts of optical devices, the field of parts of space devices, the field of equipment for petrochemical plants, the field of parts of equipment for prospecting and mining energy sources such as petroleum and gas, the field of oil refining, and the field of parts of equipment for transporting petroleum.

The sheet or tape of the invention may be used in any of various forms such as seal materials and packings, including rings, packings, gaskets, diaphragms, oil seals, bearing seals, lip seals, plunger seals, door seals, lip and face seals, gas delivery plate seals, wafer support seals, and barrel seals. The seal materials may be used in applications requiring heat resistance, solvent resistance, chemical resistance, and non-stickiness.

The sheet or tape of the invention may also be used as any of tubes, hoses, rolls, rubber rolls, flexible joints, rubber plates, coatings, belts, dampers, valves, valve sheets, valve bodies, chemical-resistant coating materials, laminating materials, and lining materials.

The cross-sectional shapes of the above rings, packings, and seals may be any various shapes, such as a rectangular shape, an O-like shape, and a ferrule shape, and any deformed shapes such as D-like, L-like, T-like, V-like, X-like, and Y-like shapes.

In the field relating to semiconductors, the sheet or tape of the invention may be used for semiconductor manufacturing devices, liquid crystal panel manufacturing devices, plasma panel manufacturing devices, plasma display panel manufacturing devices, plasma addressed liquid crystal panel manufacturing devices, organic EL panel manufacturing devices, field emission display panel manufacturing devices, solar cell substrate manufacturing devices, and semiconductor transporting devices. Examples of such devices include CVD devices, gas control devices such as gas control devices for semiconductors, dry etching devices, wet etching devices, plasma etching devices, reactive ion etching devices, reactive ion beam etching devices, sputter etching devices, ion beam etching devices, diffusion and oxidation devices, sputtering devices, ashing devices, plasma ashing devices, cleaning devices, ion implantation devices, plasma CVD devices, exhaust devices, exposure devices, grinding devices, film-forming devices, dry-etching cleaning devices, UV/O$_3$ cleaning devices, ion beam cleaning devices, laser beam cleaning devices, plasma cleaning devices, gas etching cleaning devices, extraction cleaning devices, Soxhlet extraction cleaning devices, high-temperature high-pressure extraction cleaning devices, microwave extraction cleaning devices, supercritical extraction cleaning devices, cleaning devices using hydrofluoric acid, hydrochloric acid, sulfuric acid, or ozonated water, steppers, coaters and developers, CMP devices, excimer laser exposure devices, chemical liquid pipes, gas pipes, devices involving plasma treatment such as NF$_3$ plasma treatment, O$_2$ plasma treatment, or fluorine plasma treatment, heating film-forming devices, wafer transporting devices, wafer cleaning devices, silicon wafer cleaning devices, silicon wafer processing devices, devices used in LP-CVD, devices used in lamp annealing, and devices used in reflow.

Specific examples of applications in the field relating to semiconductors include seal materials such as O-rings and gaskets for gate valves, quartz windows, chambers, chamber lids, gates, bell jars, couplings, and pumps; seal materials such as O-rings, hoses, and tubes for resist developers and strippers; lining and coating of resist developer tanks, stripper tanks, wafer cleaning liquid tanks, and wet etching tanks; diaphragms of pumps; rolls for transporting wafers; hoses and tubes for wafer cleaning liquids; seal materials for clean equipment, such as sealants for clean equipment such as cleanrooms; sealing materials for storage cabinets for devices such as semiconductor manufacturing devices and wafers; and diaphragms for transporting chemical liquids used in production of semiconductors.

In the field of automobiles, the sheet or tape of the invention may be used for engine bodies, main drive systems, valve train systems, lubrication and cooling systems, fuel systems, intake and exhaust systems, transmission systems of driveline systems, steering systems and braking systems of chassis, and electrical components such as basic electrical parts, electrical parts of control systems, and electrical accessories. The field of automobiles also relates to motorcycles.

In relation to the aforementioned engine bodies and peripherals thereof, the tape of the invention may be used for seal materials requiring heat resistance, oil resistance, fuel oil resistance, resistance to antifreeze for engine cooling, and steam resistance. Examples of such seal materials include seals such as gaskets, shaft seals, and valve stem seals, non-contact or contact packings such as self-seal packings, piston rings, split ring packings, mechanical seals, and oil seals, bellows, diaphragms, hoses, tubes, and seal materials used for electric wires, cushioning materials, damping materials, and belt AT devices.

Specific examples of applications in the fuel systems include O-rings used for fuel injection systems, cold start injectors, quick connectors of fuel lines, sender flange quick connectors, fuel pumps, fuel tank quick connectors, gasoline mixing pumps, gasoline pumps, tube bodies of fuel tubes, connectors of fuel tubes, and injectors; seals used for exhaust manifolds, fuel filters, pressure control valves, canisters, caps of fuel tanks, fuel pumps, fuel tanks, sender units of fuel tanks, fuel injection systems, high pressure fuel pumps, fuel line connector systems, pump timing control valves, suction control valves, solenoid sub-assemblies, and fuel cut valves; canister purge solenoid valve seals, onboard refueling vapor recovery (ORVR) valve seals, oil seals for fuel pumps, fuel sender seals, fuel tank roll over valve seals, filler seals, injector seals, filler cap seals, and seals of filler cap valves; hoses such as fuel hoses, fuel supply hoses, fuel return hoses, vapor (evaporator) hoses, vent (breather) hoses, filler hoses, filler neck hoses, hoses inside fuel tanks (in-tank hoses), control hoses of carburetors, fuel inlet hoses, and fuel breather hoses; gaskets used for fuel filters and fuel line connector systems, and flange gaskets used for carburetors; lining materials for vapor recovering lines, fuel feed lines, and vapor ORVR lines; diaphragms used for canisters, ORVR, fuel pumps, fuel tank pressure sensors, gasoline pumps, sensors of carburetors, combined air controlling (CAC) systems, pulsation dampers, canisters, and auto-valves, and pressure regulator diaphragms of fuel injection systems; valves for fuel pumps, carburetor needle valves, roll over check valves, and check valves; tubes used in vents (breathers) and fuel tanks; tank packings of, for example, fuel tanks, and packings of acceleration pump pistons of carburetors; fuel sender damping parts for fuel tanks; O-rings and diaphragms for regulating fuel pressure; accelerator pump cups; in-tank fuel pump mounts; injector cushion rings of fuel injection systems; injector seal rings; needle valve cores of carburetors; acceleration pump pistons of carburetors; valve sheets of combined air controlling (CAC) systems; fuel tank bodies; and sealing parts for solenoid valves.

Specific examples of applications in the brake systems include diaphragms used for mastervacs, hydraulic brake hoses, air brakes, and brake chambers of air brakes; hoses used as brake hoses, brake oil hoses, and vacuum brake hoses; seal materials such as oil seals, O-rings, packings, and brake piston seals; air valves and vacuum valves for mastervacs, and check valves for brake valves; piston cups (rubber cups) for master cylinders and brake cups; and O-rings and grommets for master cylinders and vacuum boosters of hydraulic brakes, boots for wheel cylinders of hydraulic brakes, and anti-lock brake systems (ABS).

Specific examples of applications in the basic electrical parts include insulators and sheaths of electric wires (harnesses), tubes of harness exterior parts, and grommets for connectors.

Specific examples of applications in the electrical parts of control systems include coating materials of various sensor lines.

Specific examples of applications in the electrical accessories include O-rings and packings of automobile air conditioners, cooler hoses, high-pressure air conditioner hoses, air conditioner hoses, gaskets for electronic throttle units, plug boots for direct ignition, and diaphragms for distributors. Further, the tape or sheet of the invention may be used for bonding of electric parts.

Specific examples of applications in the intake and exhaust systems include packings used for intake manifolds and exhaust manifolds and throttle body packings of throttles; diaphragms used for exhaust gas recirculation (EGR) systems, pressure control (BPT) systems, wastegates, turbocharger wastegates, actuators, actuators of variable turbine geometry (VTG) turbochargers, and exhaust purifying valves; hoses such as control hoses of exhaust gas recirculation (EGR) systems, emission control hoses, turbo oil hoses (feed side), turbo oil hoses (return side), turbo air hoses, and intercooler hoses of turbochargers, turbocharger hoses, hoses connected with compressors of turbo engines equipped with intercoolers, exhaust gas hoses, air intake hoses, turbo hoses, and diesel particulate filter (DPF) sensor hoses; air ducts and turbo air ducts; intake manifold gaskets; and seal materials of EGR systems, valve sheets for preventing after burn of AB valves, turbine shaft seals (of turbochargers, for example), and seal parts used for groove parts of rocker covers and air intake manifolds used in engines of automobiles.

In addition, with respect to the exhaust gas control parts, the sheet or tape may be used as any of seals used for vapor recovery canisters, catalytic converters, exhaust gas sensors, and oxygen sensors and seals for solenoid armatures of vapor recovery and vapor canisters; and intake manifold gaskets.

With respect to the diesel engine-related parts, the sheet or tape may be used as any of O-ring seals for direct injectors, rotary pump seals, control diaphragms, fuel hoses, EGR systems, priming pumps, and diaphragms of boost compensators. The sheet or tape may also be used for 0-rings, seal materials, hoses, tubes, and diaphragms used in urea SCR systems, urea solution tank bodies of urea SCR systems, and seal materials of urea solution tanks.

Specific examples of applications in the transmission systems include transmission-related bearing seals, oil seals, O-rings, packings, and torque converter hoses.

Examples of applications also include mission oil seals, mission oil hoses, ATF hoses, O-rings, and packings of AT.

Examples of the transmission include automatic transmission (AT), manual transmission (MT), continuously variable transmission (CVT), and dual clutch transmission (DCT).

Examples of applications also include oil seals, gaskets, O-rings, and packings for manual or automatic transmissions, oil seals, gaskets, O-rings, and packings for (belt-type or toroidal-type) continuously variable transmissions, packings for ATF linear solenoids, oil hoses for manual transmissions, ATF hoses for automatic transmissions, and CVTF hoses for (belt-type or toroidal-type) continuously variable transmissions.

Specific examples of applications in the steering systems include power steering oil hoses and high-pressure power steering hoses.

Examples of applications used in engine bodies of automobile engines include gaskets such as cylinder head gaskets, cylinder head cover gaskets, oil pan packings, and general gaskets, seals such as O-rings, packings, and timing belt cover gaskets, hoses such as control hoses, damper rubbers of engine mounts, control valve diaphragms, and camshaft oil seals.

Examples of applications in the main drive systems of automobile engines include shaft seals such as crankshaft seals and camshaft seals.

Examples of applications in the valve train systems of automobile engines include valve stem oil seals of engine valves and valve sheets of butterfly valves.

Examples of applications in the lubrication and cooling systems of automobile engines include engine oil cooler hoses of engine oil coolers, oil return hoses, seal gaskets, water hoses used around radiators, seals of radiators, gaskets of radiators, O-rings of radiators, vacuum pump oil hoses of vacuum pumps, radiator hoses, radiator tanks, diaphragms for oil pressure, and fan coupling seals.

As mentioned above, specific examples of applications in the field of automobiles include engine head gaskets, oil pan gaskets, manifold packings, seals for oxygen sensors, oxygen sensor bushes, seals for nitrogen oxide (NOx) sensors, nitrogen oxide (NOx) sensor bushes, seals for sulfur oxide sensors, seals for temperature sensors, temperature sensor bushes, seals for diesel particulate filter sensors, diesel particulate filter sensor bushes, injector O-rings, injector packings, O-rings and diaphragms of fuel pumps, gearbox seals, power piston packings, seals of cylinder liners, seals of valve stems, static valve stem seals, dynamic valve stem seals, front pump seals of automatic transmissions, rear axle pinion seals, gaskets of universal joints, pinion seals of speedometers, piston cups of foot brakes, O-rings and oil seals of torque transmission systems, seals and bearing seals of exhaust gas re-combustion systems, hoses for re-combustion systems, diaphragms for sensors of carburetors, damper rubbers (e.g., engine mounts, exhaust parts, muffler hangers, suspension bushes, center bearings, strut bumper rubbers), damper rubbers (e.g., strut mounts, bushes) for suspensions, drive system damper rubbers (e.g., dampers), fuel hoses, tubes and hoses of EGR systems, twin carburetor tubes, cores of needle valves of carburetors, flange gaskets of carburetors, oil hoses, oil cooler hoses, ATF hoses, cylinder head gaskets, water pump seals, gearbox seals, needle valve tips, reeds of reed valves for motorcycles, oil seals of automobile engines, seals of gasoline hose guns, seals for automobile air conditioners, rubber hoses for intercoolers of engines, seals of fuel line connector systems, CAC valves, needle tips, electric wires around engines, filler hoses, automobile air conditioner O-rings, intake gaskets, fuel tank materials, diaphragms for distributors, water hoses, clutch hoses, PS hoses, AT hoses, mastervac hoses, heater hoses, air conditioner hoses, ventilation hoses, oil filler caps, PS rack seals, rack and pinion boots, CVJ boots, ball joint dust covers, strut dust covers, weather strips, glass run channels, center unit packings, body side welts, bumper rubbers, door latches, dash insulators, high tension cords, flat belts, poly V-belts, timing belts, toothed belts, V-ribbed belts, tires, wiper blades, diaphragms and plungers for regulators of LPG vehicles, diaphragms and valves for regulators of CNG vehicles, DME-resistant rubber parts, diaphragms and boots of automatic belt tensioners, diaphragms and valves for idle speed control, actuators for cruise control, diaphragms, check valves, and plungers of negative-pressure pumps, diaphragms and O-rings of O.P.S., gasoline pressure relief valves, O-rings and gaskets of engine cylinder sleeves, O-rings and gaskets of wet cylinder sleeves, seals and gaskets of differential gears (seals and gaskets for gear oils), seals and gaskets of power steering systems (seals and gaskets of PSF), seals and gaskets of shock absorbers (seals and gaskets of SAF), seals and gaskets of constant-velocity joints, seals and gaskets of wheel bearings, coatings for metal gaskets, caliper seals, boots, wheel bearing seals, and bladders used in vulcanization molding of tires.

In the fields of aircraft, space and rockets, and shipping, the sheet or tape may especially be used in the fuel systems and the lubrication systems.

In the field of aircraft, the sheet or tape may be used as, for example, any of seal parts for aircraft, parts for aircraft used in relation to engine oils for aircraft, jet engine valve stem seals, gaskets, O-rings, rotary shaft seals, gaskets of hydraulic equipment, fire wall seals, hoses, gaskets, and O-rings for fuel feed, and cables, oil seals, and shaft seals for aircraft.

In the field of space and rockets, the sheet or tape may be used as, for example, any of lip seals, diaphragms, and O-rings of spacecraft, jet engines, and missiles, O-rings resistant to oils for gas turbine engines, and damper stage pads for ground level control of missiles.

In the field of shipping, the sheet or tape may be used as, for example, any of propeller shaft stern seals of screws, valve stem seals for intake and exhaustion of diesel engines, valve seals of butterfly valves, valve sheets and shaft seals of butterfly valves, shaft seals of butterfly valves, stern tube seals, fuel hoses and gaskets, O-rings for engines, cables for shipping, oil seals for shipping, and shaft seals for shipping.

In the field of chemistry such as chemical plants and the field of chemicals such as pharmaceuticals, the sheet or tape may be used in steps requiring high-level chemical resistance, such as steps of manufacturing chemicals, including pharmaceuticals, agrochemicals, coating materials, and resins.

Specific examples of applications in the fields of chemistry and chemicals include: seals used for chemical devices, pumps for chemicals, flow meters, pipes for chemicals, heat exchangers, agrochemical sprayers, agrochemical transporting pumps, gas pipes, fuel cells, analyzers and physical and chemical instruments (e.g., column fittings of analyzers and meters), expansion joints of flue-gas desulfurization devices, nitric acid plants, and turbines of power plants, seals used in medical sterilization processes, seals for plating solutions, runner seals of belts for papermaking, and joint seals of wind tunnels; O-rings used in chemical devices such as rectors and stirrers, analyzers and meters, chemical pumps, pump housings, valves, and tachometers, O-rings for mechanical seals, and O-rings for compressor sealing; packings used in high-temperature vacuum dryers and tube joints of gas chromatographs and pH meters, and glass cooler packings of sulfuric acid manufacturing devices; diaphragms used in diaphragm pumps, analyzers, and physical and chemical instruments; gaskets used in analyzers and meters; ferrules used in analyzers and meters; valve sheets; U-cups; linings used in chemical devices, gasoline tanks, and wind tunnels, and corrosion-resistant linings of tanks for anodizing on aluminum; coatings of masking jigs for plating; valve parts of analyzers and physical and chemical instruments; expansion joints of flue-gas desulfurization plants; hoses resistant to acids such as concentrated sulfuric acid, chlorine gas transporting hoses, oil-resistant hoses, and rainwater drainage hoses of benzene or toluene storage tanks; chemical-resistant tubes used in analyzers and physical and chemical instruments and medical tubes; trichloroethylene-resistant rolls for fiber dyeing and rolls for dyeing; stoppers for pharmaceuticals; medical rubber stoppers; chemical bottles, chemical tanks, bags, and chemical containers; strong acid-resistant and solvent-resistant protective items such as gloves and boots.

In the field of photography such as film processors, the field of printing such as printers, and the field of coatings such as coating equipment, the sheet or tape may be used as any of rolls, belts, seals, and valve parts of dry copiers.

Specific examples of applications in the field of photography, the field of printing, and the field of coatings include surface layers of transfer rollers of copiers, cleaning blades of copiers, and belts of copiers; rolls (e.g., fixing rolls, adhesion rolls, and pressure rolls) and belts for OA equipment such as copiers, printers, and faxes; rolls, roll blades, and belts of PPCs; rolls of film processors and X-ray film processors; printing rolls, scrapers, tubes, valve parts, and belts of printing equipment; ink tubes, rolls, and belts of printers; application rolls, scrapers, tubes, and valve parts of application or coating equipment; processing rolls, gravure rolls, guide rolls, guide rolls of coating lines for manufacturing of magnetic tapes, gravure rolls of coating lines for manufacturing of magnetic tapes, and coating rolls.

In the field of food machinery such as food plant equipment and household items, the sheet or tape may be used in steps of food production, food transportation, and food storage.

Specific examples of applications in the field of food machinery include seals of plate-type heat exchangers, solenoid valve seals of vending machines, packings of thermo pots, sanitary pipe packings, packings of pressure cookers, seals of boilers, gaskets for heat exchangers, diaphragms and packings for food processing equipment, rubber materials (e.g., seals such as heat exchanger gaskets, diaphragms, and O-rings, pipes, hoses, sanitary packings, valve packings, packings for filling used as joints between the mouth of a container such as a bottle and a filler) for food processing equipment. The sheet or tape may also be used as packings, gaskets, tubes, diaphragms, hoses, and joint sleeves used for products such as alcohols and soft drinks, filling devices, food sterilizers, brewing devices, boilers, and food vending machines.

In the field of equipment for nuclear power plants, the sheet or tape may be used as, for example, any of check valves and reducing valves around reactors and seals of devices for concentration of uranium hexafluoride.

Specific examples of applications in the field of general industry include seal materials for hydraulic devices such as machine tools, construction machinery, and hydraulic machines; seals and bearing seals of hydraulic, lubricating machinery; seal materials used in mandrels; seals used for windows of dry cleaning devices; seals and (vacuum) valve seals of cyclotrons, seals of proton accelerators, seals of automatic wrapping machines, diaphragms of pumps for analyzers (air pollution monitoring devices) for sulfurous acid gas or chlorine gas in the air, snake pump lining, rolls and belts of printers, belts (conveyor belts) for transportation, squeeze rolls for pickling of sheet steel, cables of robots, solvent squeezing rolls in aluminum rolling lines, O-rings of couplers, acid-resistant cushioning material, dust seals and lip rubbers of sliding portions of cutting machinery, gaskets of garbage incinerators, friction materials, metal or rubber surface modifiers, and covering materials. The sheet or tape may also be used as gaskets and seal materials of devices used in papermaking processes, sealing agents of filter units for cleanrooms, sealing agents for construction, protective coatings for concrete and cement, glass cloth impregnating materials, processing aids for polyolefins, moldability improving additives for polyethylene, fuel containers of small generators and lawn mowers, and pre-coated metals prepared by primer-treating metal plates. Also, fabrics impregnated and sintered may be used as sheets or belts.

Specific examples of applications in the field of steel include sheet steel processing rolls of sheet steel processing equipment.

Specific examples of applications in the field of electrics include insulating oil caps of Shinkansen, venting seals of liquid-immersed transformers, seals of transformers, jackets of oil well cables, seals of ovens such as electric furnaces, window frame seals of microwave ovens, seal materials used in bonding wedges and necks of CRTs, seal materials of halogen lamps, fixing agents for electric parts, seal materials for treating terminals of sheathed heaters, and seal materials used in insulating and damp-proofing treatment on wire terminals of electrical devices. The sheet or tape may also be used as covering materials for oil- and heat-resistant electric wires, highly heat-resistant electric wires, chemical-resistant electric wires, highly insulating electric wires, high voltage power lines, cables, electric wires used in geothermal power generation devices, and electric wires used around automobile engines. The sheet or tape may also be used as any of oil seals and shaft seals of cables for vehicles. The sheet or tape may also be used as any of electrically insulating materials (e.g., materials used for insulating spacers of electric devices, insulating tapes used at joints and ends of cables, and heat-shrinkable tubes) and materials for electric and electronic devices used in high-temperature atmosphere (e.g., lead wire materials for motors and electric wire materials used around high-temperature furnaces). The sheet or tape may also be used as any of sealing layers and protecting films (back sheets) of solar cells.

In the field of fuel cells, the sheet or tape may be used as, for example, any of seal materials between electrodes or between an electrode and a separator in polymer electrolyte fuel cells and phosphoric acid salt fuel cells, and seals, packings, and separators of pipes for hydrogen, oxygen, or generated water.

In the field of electronic parts, the sheet or tape may be used as, for example, any of heat-radiating materials, electromagnetic-wave-shielding materials, and gaskets for hard disk drives (magnetic recording devices) of computers. The sheet or tape may also be used as shock-absorbing rubbers (crash stoppers) of hard disk drives, binders for electrode active materials of nickel hydrogen secondary batteries, binders for active materials of lithium ion batteries, polymer electrolytes of lithium secondary batteries, binders for positive electrodes of alkaline storage batteries, binders for EL elements (electroluminescent elements), binders, seal materials, and sealing agents for electrode active materials of capacitors, covering materials for quartz of optical fibers, films and sheets such as covering materials for optical fibers, potting, coating, or bonding seals for electronic parts and circuit boards, fixing agents for electronic parts, modifiers for seal materials such as epoxy compounds, coatings for printed circuit boards, modifiers for printed circuit board prepreg resins such as epoxy compounds, scattering inhibitors for electric light bulbs, gaskets for computers, large computer cooling hoses, packings such as gaskets and O-rings for secondary batteries, especially lithium secondary batteries, sealing layers, connectors, and dampers covering one or both of outside surfaces of organic EL structures.

In the field of equipment for transporting chemicals, the sheet or tape may be used as, for example, any of safety valves and loading valves of trucks, trailers, tank trucks, and shipping.

In the field of parts of equipment for prospecting and mining energy sources such as petroleum and gas, the sheet or tape may be used as, for example, any of seal materials used in mining petroleum or natural gas and boots of electric connectors used in oil wells.

Specific examples of applications in the field of parts of equipment for prospecting and mining energy sources include drill bit seals, pressure-control diaphragms, seals of horizontal drilling motors (stators), stator bearing (shaft) seals, seal materials used in blowout preventers (BOP), seal materials used in rotary blowout preventers (pipe wipers), seal materials and gas-liquid connectors used in measurement while drilling systems (MWD), logging tool seals (e.g., O-rings, seals, packings, liquid-gas connectors, and boots) used in logging equipment, expandable packers and completion packers, and packer seals used therefor, seals and packings used in cementing devices, seals used in perforators (perforating devices), seals, packings, and motor linings used in mud pumps, covers of underground sound inspection devices, U-cups, composition seating cups, rotary seals, laminate elastomeric bearings, seals for flow control, seals for sand control, seals of safety valves, seals of hydraulic fracturing equipment, seals and packings of linear packers and linear hangers, seals and packings of well heads, seals and packings of chokes and valves, seal materials for logging while drilling (LWD) systems, diaphragms (e.g., diaphragms for feeding lubricants in petroleum mining pits) used in prospecting and mining petroleum, gate valves, electronic boots, and seal elements of perforating guns.

The sheet or tape may also be used as, for example, any of joint seals in kitchens, bathrooms, and lavatories; fabrics of outdoor tents; seal materials for materials of stamps; rubber hoses for gas heat pumps and Freon-resistant rubber hoses; films, linings, and weather-resistant covers for agriculture; and tanks of laminated sheet steel used in the field of construction or home appliances.

The sheet or tape may also be used as an article bonded to a metal such as aluminum. Examples of such applications include door seals, gate valves, pendulum valves, and solenoid tips, as well as piston seals and diaphragms bonded to metal and metal rubber parts such as metal gaskets bonded to metal.

The sheet or tape of the invention may also be used as any of rubber parts, brake shoes, and brake pads of bicycles.

One exemplary form of the sheet or tape is a belt.

Examples of the belt include the following: power transmission belts (including flat belts, V-belts, V-ribbed belts, toothed belts), and transportation belts (conveyor belts) such as flat belts used for portions exposed to high temperatures, such as portions around engines of agricultural machinery, machine tools, and industrial machinery; conveyor belts for transporting scattered matters or particles of coal, smashed rock, earth and sand, ores, and wood chips at high temperatures; conveyor belts used in iron mills, such as blast furnaces; conveyor belts used for applications exposed to high temperatures in high precision machine assembling factories and food factories; V-belts and V-ribbed belts for agricultural machinery, general equipment (e.g., OA equipment, printers, dryers for business purposes), and automobiles; power transmission belts of transporting robots; toothed belts such as power transmission belts of food machinery and machine tools; and toothed belts for automobiles, OA equipment, medical uses, and printers.

In particular, timing belts are typical toothed belts for automobiles.

The above belt may have a single layer structure or a multi-layer structure.

In the case of a multi-layer structure, the belt may have the sheet or tape of the invention and a layer of another material.

Examples of the layer of another material in the multi-layer belt include layers formed from different rubber, layers formed from thermoplastic resin, fiber-reinforced layers, canvas layers, and metal foil layers.

The sheet or tape of the invention may also be used as damper pads for industrial use, damper mats, slab mats for railways, pads, and damper rubbers for automobiles. The damper rubbers for automobiles may be damper rubbers for engine mounts, motor mounts, member mounts, strut mounts, bushes, dampers, muffler hangers, and center bearings.

Examples of other applications include joint parts such as flexible joints and expansion joints, boots, and grommets. In the field of shipping, the sheet or tape may be used for marine pumps.

The joint parts are joints used for pipes and piping equipment, and are used for preventing vibrations and noises generated by piping systems, absorption of expansion and contraction or displacement due to temperature change and pressure change, absorption of dimensional changes, and mitigation or prevention of influences due to earthquakes or land subsidence.

The flexible joints and expansion joints may be preferably used as molded articles with complicated shapes for shipbuilding piping, piping of machinery such as pumps and compressors, chemical plant piping, electric piping, piping of civil engineering works and waterworks, and automobiles.

The boots may be preferably used as molded articles with complicated shapes, such as boots for various industries, including boots for automobiles such as constant-velocity joint boots, dust covers, rack and pinion steering boots, pin boots, and piston boots, boots for agricultural machinery, boots for industrial vehicles, boots for construction machinery, boots for hydraulic machinery, boots for pneumatic machinery, boots for centralized lubrication systems, boots for liquid transportation, boots for firefighting, and boots for liquefied gas transportation.

The sheet or tape of the invention may also be used as any of diaphragms for filter presses, diaphragms for blowers, diaphragms for water supply, diaphragms for liquid storage tanks, diaphragms for pressure switches, diaphragms for accumulators, and diaphragms for air springs such as suspensions.

The sheet or tape of the invention may also be used as a cushioning material for heat-press molding in production of decorative plywood, printed circuit boards, electrically insulated plates, and hard polyvinyl chloride laminates from melamine resin, phenol resin, or epoxy resin.

The sheet or tape of the invention may also contribute to give impermeability to various supporters such as sealing gaskets related to weapons and protective clothing against contact with invasive chemicals.

The sheet or tape of the invention may also be used as any of O-rings (square-rings), V-rings, X-rings, packings, gaskets, diaphragms, oil seals, bearing seals, lip seals, plunger seals, door seals, lip and face seals, gas delivery plate seals, wafer support seals, barrel seals, and other seal materials for sealing lubricants (e.g., engine oil, mission oil, gear oil), fuel oils, or greases (in particular, urea grease) containing amine additives (in particular, amine additives used as antioxidants, detergents, or dispersants) used in transports such as automobiles and shipping. The sheet or tape may also be used as any of tubes, hoses, rubber rolls, coatings, belts, and valve bodies of valves. The sheet or tape may also be used as any of laminating materials and lining materials.

The sheet or tape may also be used as any of covering materials for heat- and oil-resistant electric wires used as, for example, electric wires of sensors contacting transmission oil and/or engine oil in internal combustion engines of automobiles and detecting the oil temperature and/or the oil pressure, and may be used in high-temperature environment such as the inside of oil pans of automatic transmissions or engines.

Other examples of such applications include non-viscous oil-resistant rolls for copiers, weather-resistant freeze-preventive weather strips, rubber stoppers for infusion solution, vial rubber stoppers, release agents, non-viscous light-duty transport belts, adhesion-preventive coatings of pulley gaskets of automobile engine mounts, covering processing of synthetic fibers, and bolt parts or joints having a packing covering thin layer.

The applications of the sheet or tape of the invention with respect to the automobile-related parts include motorcycle parts having the same structures.

Examples of the automobile-related fuels include light oil, gasoline, and fuels for diesel engines (including biodiesel fuel).

Use of the sheet, tape, laminate, pipe, riser tube, or flowline in a high-temperature environment is also encompassed by the invention.

EXAMPLES

The invention will be described below referring to, but are not limited to, examples.

The parameters in the examples were determined by the following methods.
(Composition of Fluororesin)

The composition of the fluororesin was determined by $^{19}$F-NMR at a measurement temperature of (melting point of the polymer+20°) C. using a nuclear magnetic resonance device AC300 (Bruker-Biospin), appropriately in combination with elemental analysis in accordance with the integral values of the respective peaks and the types of the monomers.
(Melting Point (° C.) of Fluororesin)

The melting point was determined from the peak on an endothermic curve obtained by thermal analysis at a temperature-increasing rate of 10° C./min using a differential scanning calorimeter RDC220 (Seiko Instruments Inc.) in conformity with ASTM D-4591.
(Melt Flow Rate (MFR) of Fluororesin)

The MFR was defined as the mass (g/10 min) of a polymer flowing out of a nozzle having an inner diameter of 2 mm and a length of 8 mm per 10 minutes at 240° C. or 297° C. and a load of 5 kg using a melt indexer (Toyo Seiki Seisaku-sho, Ltd.) in conformity with ASTM D3307-01.

Examples and Comparative Examples

Films of the following fluororesins were prepared.
(Fluororesins)

KF850 (vinylidene fluoride homopolymer, melting point: 173° C., MFR: 20.0 g/10 min (240° C., 5-kg load)) available from Kureha Corp.

NEOFLON ETFE EP546 (ethylene/tetrafluoroethylene copolymer, melting point: 253° C., MFR: 6.0 g/10 min (297° C., 5-kg load)) available from Daikin Industries, Ltd.

A fluororesin film, a carbon fiber, and a fluororesin film were disposed in the given order, and the ratio (by mass) of the fluororesin and the carbon fiber was set to 50:50. The workpiece was heat-pressed under the following conditions to give a tape. The resulting tape had a thickness of 1 mm.
(Carbon Fiber)

T700 SC-12000 (tensile strength: 4900 MPa, tensile modulus: 230 GPa) available from Toray Industries, Inc.

(Heat-Press Conditions)

Example 1

PVDF
Press temperature: 240° C.
Heat retention time: 5 minutes
Pressing time: 10 minutes
Pressure: 3 MPa Example 2

PVDF
Press temperature: 330° C.
Heat retention time: 30 seconds
Pressing time: 10 minutes×3
Pressure: 3 MPa Comparative Example 1

ETFE
Press temperature: 300° C.
Heat retention time: 5 minutes
Pressing time: 10 minutes
Pressure: 3 MPa The resulting tape was subjected to a tensile test under the following conditions, and thereby the tensile strength, tensile modulus, and tensile elongation thereof were determined. Table 1 shows the results.

(Tensile Test Conditions)

Tension rate: 2 mm/min
Shape of sample: micro dumbbell

Using the fluororesins and the carbon fibers used in the examples and the comparative examples, the bond strength was determined by the microdroplet method as follows. The results are shown in Table 1.

First, both ends of a carbon monofilament taken out of a carbon fiber strand were fixed on a U-shaped test stand using adhesive. A fluororesin heat up to 340° C. to melt was brought into contact with the carbon monofilament fixed on the U-shaped test stand, whereby the fluororesin was attached to the carbon monofilament. The carbon monofilament with the fluororesin attached thereto was cooled at room temperature, and the fluororesin was again molten at 360° C. into a droplet shape. The carbon monofilament with the fluororesin attached thereto was again sufficiently cooled at room temperature, and the test stand was mounted on a test stand-mounting folder. The test stand-mounting folder is coupled with a test stand transfer device equipped with a load cell, and the test stand can be moved in the filament axis direction of the carbon monofilament at a constant speed. Then, the test stand was moved in the filament axis direction of the carbon monofilament at a speed of 0.3 mm/min, and the maximum load in pulling the carbon monofilament out of the fluororesin droplet was measured. This value was divided by the contact area between the microdroplet and the carbon monofilament before the measurement, and the resulting value was taken as the bond strength. The test was performed using a microdroplet having a diameter of 50 to 90 μm at room temperature. The result of the sample was an average of N=20 or more.

TABLE 1

| | Fiber | Resin | Tensile strength (MPa) | Tensile modulus (GPa) | Tensile elongation (%) | Bond strength by microdroplet method (MPa) |
|---|---|---|---|---|---|---|
| Example 1 | T700SC-12000 | KF850 | 620 | 31 | 3.8 | 73 |
| Example 2 | | | 1500 | 105 | 1.6 | |
| Comparative Example 1 | | EP546 | 390 | 10 | 5.4 | 39 |

REFERENCE SIGNS LIST 1a, 1b, 1c: tape
2: central portion
3: thin portion
4: protrusion
5: thin portion
10: pipe
11: first layer
12: second layer
14, 15, 16: tape
20: pipe
21: first layer
22: second layer
23: third layer
30: riser tube or flowline
31: body (carcass)
32: first layer
33: second layer
34: first reinforcing layer
35: second reinforcing layer
36: outer layer resin

The invention claimed is:
1. A sheet comprising:
a carbon fiber having an average fiber length of 50 mm or longer; and
a fluororesin layer disposed around a carbon monofilament constituting the carbon fiber,
a fluororesin constituting the fluororesin layer being polyvinylidene fluoride,
the sheet having a tensile strength of 400 MPa or higher and a tensile modulus of 15000 MPa or higher.
2. The sheet according to claim 1,
wherein the polyvinylidene fluoride is a homopolymer of vinylidene fluoride.
3. The sheet according to claim 1,
wherein the sheet is a tape.

4. A laminate comprising:
a first layer; and
a second layer that is disposed on the first layer and that includes the sheet according to claim 1.

5. A pipe comprising the laminate according to claim 4.

6. The pipe according to claim 5,
wherein the first layer is a flexible tube.

7. A riser tube comprising the pipe according to claim 5.

8. A flowline comprising the pipe according to claim 5.

9. A pipe comprising:
a first layer; and
a second layer that is disposed on the first layer and that includes the sheet according to claim 3,
the first layer and the second layer being stacked in the given order from an inner side of the pipe,
the second layer being formed from the tape wrapped around an outer surface of the first layer.

* * * * *